(12) United States Patent
Doherty

(10) Patent No.: US 6,325,195 B1
(45) Date of Patent: Dec. 4, 2001

(54) MACHINE SAFETY GUARD (76) Inventor: Steven G. Doherty, 33 Winn St., Belmont, MA (US) 02178

(*) Notice: Subject to any disclaimer, the term of this patent is extended or adjusted under 35 U.S.C. 154(b) by 0 days.

(21) Appl. No.: 09/761,846

(22) Filed: Jan. 18, 2001

Related U.S. Application Data (63) Continuation of application No. 08/969,715, filed on Nov. 17, 1997, now abandoned, which is a continuation of application No. 08/618,664, filed on Mar. 19, 1996, now abandoned.

(51) Int. Cl.$^7$ ................................ F16P 3/00; E06B 9/68
(52) U.S. Cl. ................... 192/133; 192/129 A; 160/24; 160/120; 52/DIG. 14
(58) Field of Search .................. 192/133, 135, 192/129 A; 160/24, 120, 267.1, DIG. 7; 52/64, DIG. 14

(56) References Cited

U.S. PATENT DOCUMENTS

| | | |
|---|---|---|
| 420,668 | 2/1890 | Wallace . |
| 717,173 | 12/1902 | Cundell . |
| 848,578 | 3/1907 | Thelin . |
| 982,105 | 1/1911 | Thomas . |
| 1,901,073 | 3/1933 | Bailey . |
| 2,104,648 | 1/1938 | Hickey . |
| 2,476,792 | 7/1949 | Allen . |
| 2,655,067 | 10/1953 | Bechler . |
| 2,752,150 | 6/1956 | Richmond et al. . |
| 3,292,685 | 12/1966 | Clark . |
| 3,728,057 | 4/1973 | Grundmann et al. . |
| 3,803,943 | 4/1974 | Woloszyk . |
| 3,814,164 | 6/1974 | Kuss . |
| 3,912,061 | 10/1975 | Foster, Jr. . |
| 4,088,157 | 5/1978 | Chen et al. . |

(List continued on next page.)

FOREIGN PATENT DOCUMENTS

| | | |
|---|---|---|
| 3032697 | 8/1982 | (DE) . |
| 4443231 | 6/1995 | (DE) . |
| 1596237 | 8/1881 | (GB) . |
| 2014267 | 8/1979 | (GB) . |

OTHER PUBLICATIONS

Declaration of R. Peter Kimener Regarding U.S. Playing Card Installation; 3 pages with Attachments A, B and C.

Declaration of R. Peter Kimener Regarding Proctor and Gamble Installation; 3 pages with Attachments A, B and C and D.

Declaration of Cary Pinkalla Regarding GM Metal Fabricating Installation; 3 pages with Attachment A.

Article "Power Curtains Automatic Safety in Robotic Welding Operation"; from *Engineer's Digest*, Oct. 1993; pp. 162–163.

Article "It's Curtains for Arc Flash in This Robotic–Welding Cell"; from *Welding Design & Fabrication.* Nov. 1993; p. 16.

Article "Flexibility, Control Are Welding Watchwords"; from *Tooling and Production*, Oct. 1993; pp. 29–32.

(List continued on next page.)

Primary Examiner—Richard M. Lorence
(74) Attorney, Agent, or Firm—Dennison, Scheiner, Schultz & Wakeman (57) ABSTRACT

A machine safety guard unit system having a flexible panel moved upwards and downwards between track members with the system positioned between the operative parts of a machine and a machine operator, such panel when closed protecting the machine operator and when moved upwards into its open mode, allowing access to the machine and preventing the machine from operating. In some embodiments more than one of such units can be disposed around a machine with alarm means; and in yet other embodiments, with interengagement means connecting such units.

40 Claims, 4 Drawing Sheets

U.S. PATENT DOCUMENTS

| | | |
|---|---|---|
| 4,160,972 | 7/1979 | LaMell . |
| 4,179,987 | 12/1979 | Dohm, Jr. . |
| 4,342,354 | 8/1982 | Leivenzon et al. . |
| 4,379,481 | 4/1983 | Juner . |
| 4,502,375 | 3/1985 | Hignite et al. . |
| 4,593,491 | 6/1986 | Carlson et al. . |
| 4,596,162 | 6/1986 | Walter et al. . |
| 4,690,195 | 9/1987 | Taylor . |
| 4,706,726 | 11/1987 | Nortoft . |
| 4,721,946 | 1/1988 | Zunkel . |
| 4,800,946 | 1/1989 | Rosenoy . |
| 4,849,735 | 7/1989 | Kirtley et al. . |
| 4,887,659 | 12/1989 | West . |
| 4,887,660 | 12/1989 | Kraus . |
| 4,896,714 | 1/1990 | Ellis . |
| 4,934,437 | 6/1990 | Kraeutler . |
| 4,974,658 | 12/1990 | Komatsu . |
| 5,022,452 | 6/1991 | Burrell . |
| 5,025,846 | 6/1991 | West . |
| 5,198,974 | 3/1993 | Orsat . |
| 5,203,175 | 4/1993 | Farrey et al. . |
| 5,295,527 | 3/1994 | West . |
| 5,323,831 | 6/1994 | Manthei . |
| 5,329,781 | 7/1994 | Farrey et al. . |
| 5,353,858 | 10/1994 | Hartmann . |
| 5,353,859 | 10/1994 | Oltahfer et al. . |
| 5,386,891 | 2/1995 | Shea . |
| 5,540,269 | 7/1996 | Plumer . |
| 5,552,769 | 9/1996 | Riordan . |

OTHER PUBLICATIONS

Product Brochure "Powr–Shield Automated Safety Curtain"; from Frommelt Safety Products Corporation, copyright 1993; 4 pages.

Product Brochure "Choosing the Right Vertical Conveyor"; from Pflow Industries, copyright 1995; 8 pages.

Product Brochure Section "Understanding ANSI Safety Laws", from Freightlift America! copyright 1993; 1 page.

Safety Standard for Conveyors and Related Equipment, ASME B20.1–1993 The American Society of Mechanical Engineers.

Application Guidelines for Vertical Reciprocating Conveyors, prepared by the Conveyor Product Section of The Material Handling Institute.

4 pages product information from Rite–Hite Corporation— Description: "Hydraulic leveler overhead door interlock:Kit Part #04622"—Drawing #9254 dated Aug. 7, 1977—Drawing #4055 dated Feb. 12, 1988—Output from Rite–Hite Order Processing Database showing shipments of Part No. 04622 in 1991 and 1992 (generated Nov. 11, 1996).

Machine Guarding Safety Products Catalog AZ–6R Schmersal Safety Interlock Switches.

Declaration of Michael Calvert dated Apr. 7, 2000 including attached schematics dated in 1993, 3 pages.

MACHINE SAFETY GUARD

This application is a continuation of application Ser. No. 08/969,715, filed Nov. 17, 1997, now abandoned which in turn is a continuation of application Ser. No. 08/618,664 filed Mar. 19, 1996, now abandoned.

BACKGROUND OF THE INVENTION

1. Field of the Invention

The device of this invention resides in the area of shields that are positioned between a machine operator and the operative parts of a machine and more particularly relates to a machine safety guard and system using a plurality of such machine safety guards, each of which can be positioned, and selectively opened or closed, in front of operative parts of a machine.

2. Description of the Prior Art

Industrial machinery can cause injuries to operators thereof if they are caught within the operative parts of the machinery or struck by elements emanating from such machinery. To reduce the chances of such injuries, the government through OSHA has instituted regulations which call for protective safety guards to cover certain operative parts of a machine to prevent a worker from being caught thereby or otherwise injured as the machine operates. These safety regulations provide for protective machine guards to be positioned in front of the operative parts of machinery, some utilizing machine power cut-off switches which function when such safety guards are removed from their positions in front of the operative parts of the machinery. Frequently such safety guards can be in the form of a rigid sheet of plastic or glass which is fixed in front of the operative parts of the machinery. When such protective material is removed to gain access to the operating parts of the machinery, an electrical interlocking mechanism causes power to the machine to be turned off so that the machinery cannot be inadvertently operated when the safety guard is removed. Frequently machines require set-up for different jobs and this setting up period requires the operator to adjust elements of the machine to accomplish different functions during its operation such as using different materials or sizes of materials and/or different workpieces. It is often difficult and time-consuming to remove safety guards to gain access to the machine to change its set-up or otherwise adjust or repair such machinery, and such time-consuming procedures increase manufacturing costs.

Also well known in the prior art are light beam detectors which can sense when a light beam is interrupted for the purpose of shutting down the machinery. Such a system senses when one tries to reach towards a machine but is ineffective against projectiles flying away from the machinery which could injure a bystander.

SUMMARY OF THE INVENTION

It is an object of this invention to provide an improved machine safety guard interconnected to a machine's power source which safety guard is fast and easy to operate and which gives an operator of a machine quick and safe access to the machine to change its set-up or otherwise adjust or fix any operative parts of the machine when the safety guard is in its open mode position and the machinery is not operating.

It is a further object of this invention to provide a system of independently operated safety guard units which in one embodiment can be interconnected to one another and which individual units can be positioned around or on a machine at selected angles, heights, widths and distances from the machine to allow access to various operating parts of the machine at any desired time by the operator. Further, the safety guard units of this invention can be quickly and easily operated to disable the machine to allow access thereto to provide safety to the operator while set-up procedures or other maintenance operations are being performed on the machinery.

To achieve the goals of this invention a safety guard unit is provided which has a first and second side track member joined at their tops in one embodiment by an upper support member which is disposed perpendicularly to the side track members. Each of the side track members can extend perpendicular to the floor, each track member having an inwardly facing channel defined on its inner side with such channels facing and aligned with one another. these side track members are disposed in front of the operative parts of the machine to be shielded by the safety guard. Within the upper support member can be disposed a rotatable reel having a flexible, transparent panel attached thereto along its length. This panel can be a sheet of clear, transparent PVC material or equivalent material. A reversible motor is provided to drive the reel and attached transparent panel to wind and unwind it to move the panel up and down within the channels between the first and second side track members. The flexible, transparent panel can be stopped at any position during its vertical travel, either all the way up, all the way down or at any intermediate position. The motor can be located on the upper support member or at any desired location on the safety guard unit and can be of the reversing type. The bottom of the guard can be weighted to pull it down against the force of the motor or other systems of pulleys or gears can be used to aid in the raising or lowering of the transparent panel. The transparent panel can be raised or lowered very quickly, and its bottom which is generally disposed horizontally can be flexible so that if it strikes the operator while in operation, it will not cause harm because of the flexible nature of the clear plastic sheet material. A plurality of these safety guard units of this invention can be disposed around a large piece of equipment, each safety guard unit giving access to a different portion of the machinery to be operated. The safety guard units can have differing widths and heights and can have independent control switches for each safety guard unit so that each unit's transparent panel can be raised or lowered independently of another's to gain access to a particular part of the machinery. The safety guard units, because they also tend to block sound, will cut down on the noise emanating from operating machinery.

The safety guard units can be mounted on the machinery itself or disposed adjacent to the machinery, either permanently affixed to the floor or disposed on wheels for portability to a desired location or position where the wheels can be locked.

DESCRIPTION OF THE PREFERRED EMBODIMENT(S)

Figure 1:
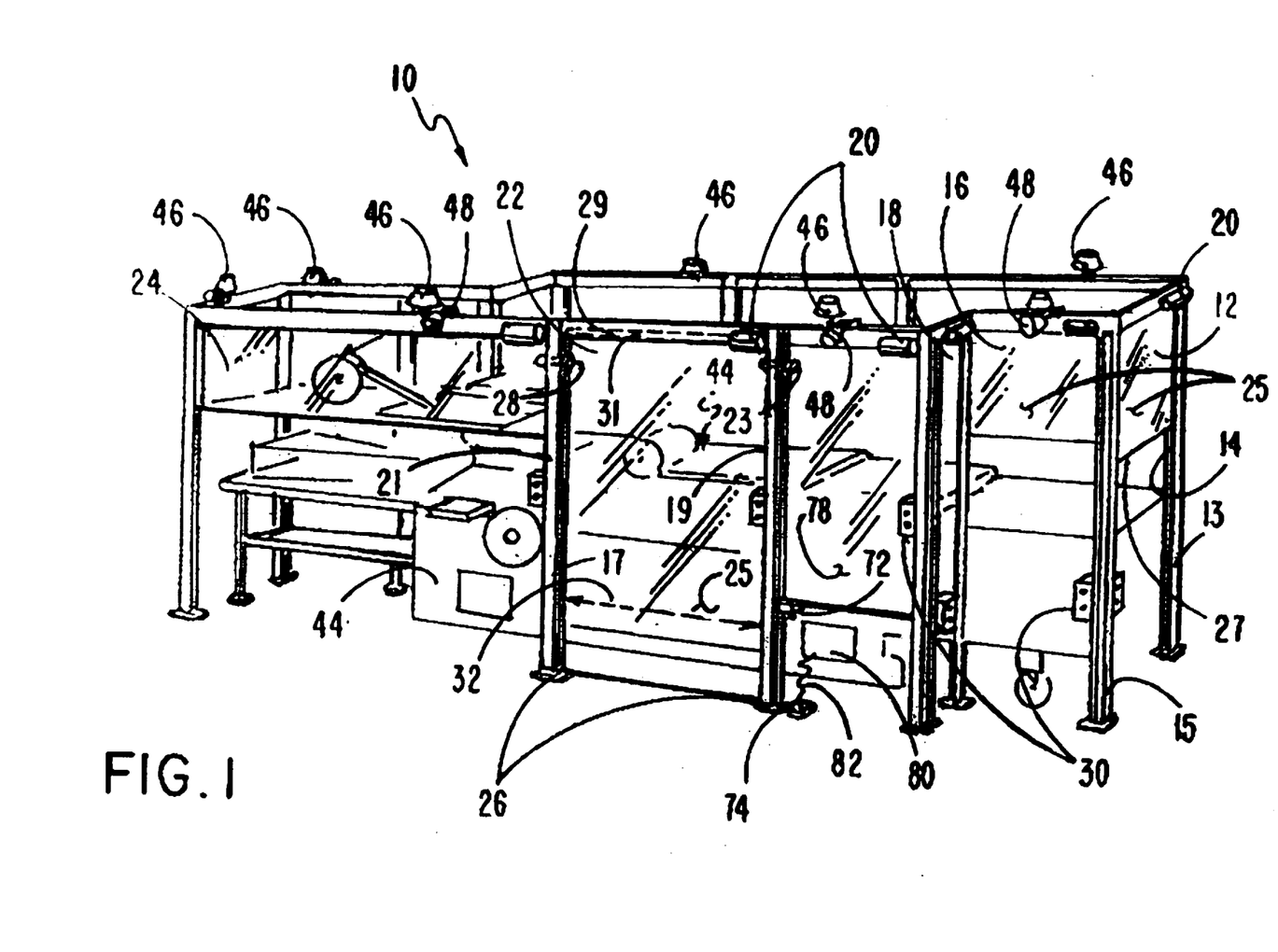
FIG. 1 illustrates a perspective view of a plurality of interlocked safety guard units affixed to the floof, such units surrounding an elongated piece of machinery.
Figure 4:
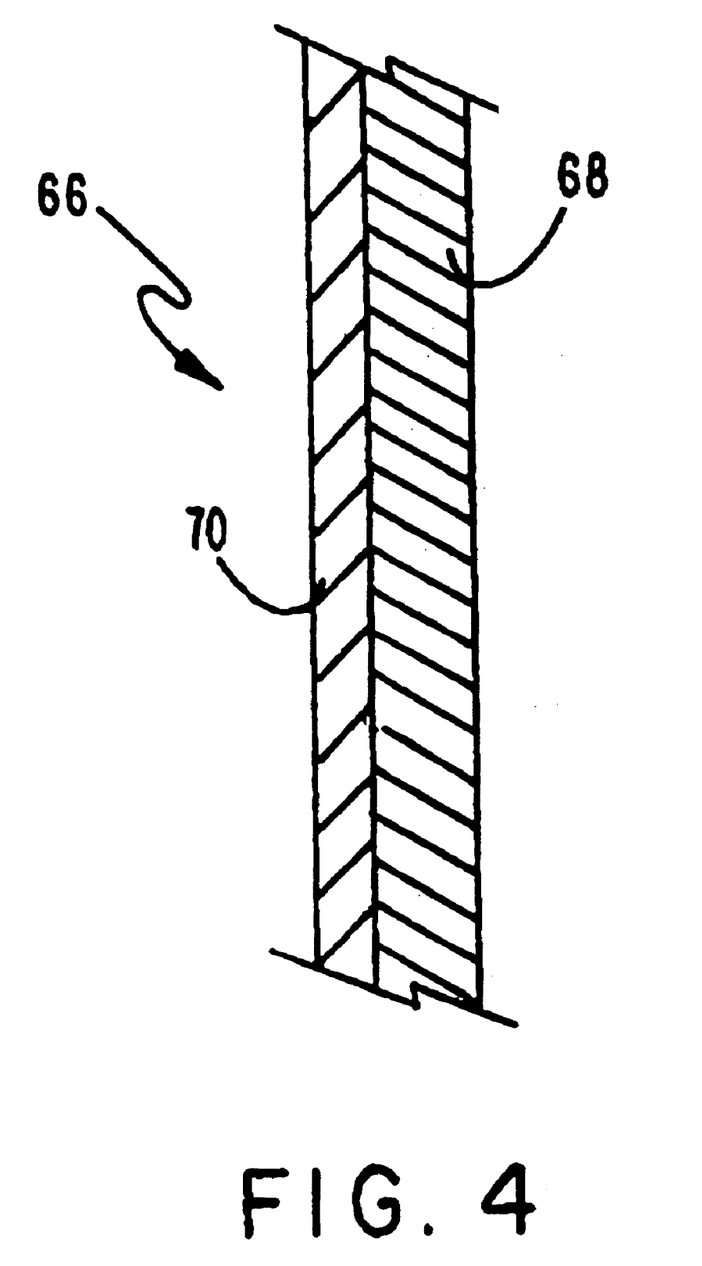
FIG. 4 illustrates a cross-sectional view of an enlarged segment of a panel having a sound-proofing layer laminated to a plastic layer.

FIG. 1 illustrates the safety guard system 10 of this invention surrounding piece of machinery 44, shown in outline form. Safety guard system 10 is made up of a plurality of individual safety guard units, such as first safety guard unit 12, second safety guard unit 16, third safety guard unit 22 or fourth safety guard unit 24. These safety guard units are described with reference to one, but which description can be applied to each of the safety guard units. The safety guard units can be made of plastic, metal or other equivalent sturdy material in different widths and heights and positioned for use in various configurations to accommodate different shapes and sizes of machinery. Each safety guard unit, such as first safety guard unit 12, is comprised of first and second side track members 15 and 13 which are generally vertically disposed perpendicular to the floor. In one embodiment of the invention the side track members can be joined at their tops by an upper support member 31 to form a free-standing unit. Disposed in upper support member 31 can be horizontally disposed reel 29. A panel of strong, flexible, transparent material 25 can be windably attached to reel 29, which panel travels between first and second side track members 15 and 13. In some embodiments the ends of reel 29 can be rotatably attached to the tops of first and second side track members 15 and 13. First and second side track members 15 and 13 have, respectively, a first and second channel defined therein facing inwardly such as second channel 14 visible in FIG. 1. In one embodiment transparent panel 25 can ride up and down with one side thereof within second channel 14 and the other side thereof within the first channel, not shown in this view, of first safety guard unit 12. Transparent panel 25 can move up and down, winding and unwinding on reel 29 similar in fashion to the action of a window shade powered by reversible motor 20. Flexible, transparent panel 25 can be made of PVC plastic or other equivalent material and in one embodiment can be weighted at its bottom portion to aid in such panel's moving downward smoothly within the inwardly facing channels. In some embodiments the panel can be opaque. In yet other embodiments the panel can be made of sound-proof material, such as a panel made with flexible sound-reducing barrier sheets, such as EAR composites from Cabot Safety Corporation or equivalent, either alone acting as a panel or laminated to another flexible sheet. Sound reduction is also possible merely by using two vinyl sheets with an air space defined between them. FIG. 4 illustrates an enlarged cross-sectional view of a sound-proof barrier 66 with a flexible sheet 70 laminated to a flexible, sound-proof sheet 68 to form a panel. The panel can also be similar in structure to flexible metal rolling panes or grills or folding metal sections. Reversible motor 20 can, upon activation of switch 30 or equivalent means of activation, drive the transparent panel either upwards or downwards within the channels. When transparent panel 25 is in its downwardmost position, the safety guard unit protects the operator from the operating machinery located therebehind. As seen in FIG. 1, third safety guard unit 22 has first side track member 19 and second side track member 19 which members are positioned perpendicularly to the floor and which, in some embodiments, can have floor mounts 26 which can be attachable to the floor, if desired. When in the downmost position, the panel can have an engageable interlock, such as female plug 72, which receives male plug 74 on the bottom of panel 78 to complete a circuit to machine motor 80 to allow current to be provided to such motor. When panel 78 rises, it pulls male plug 74 out of female plug 72 and breaks the circuit along line 82, thereby shutting off motor 80.

Figure 3:
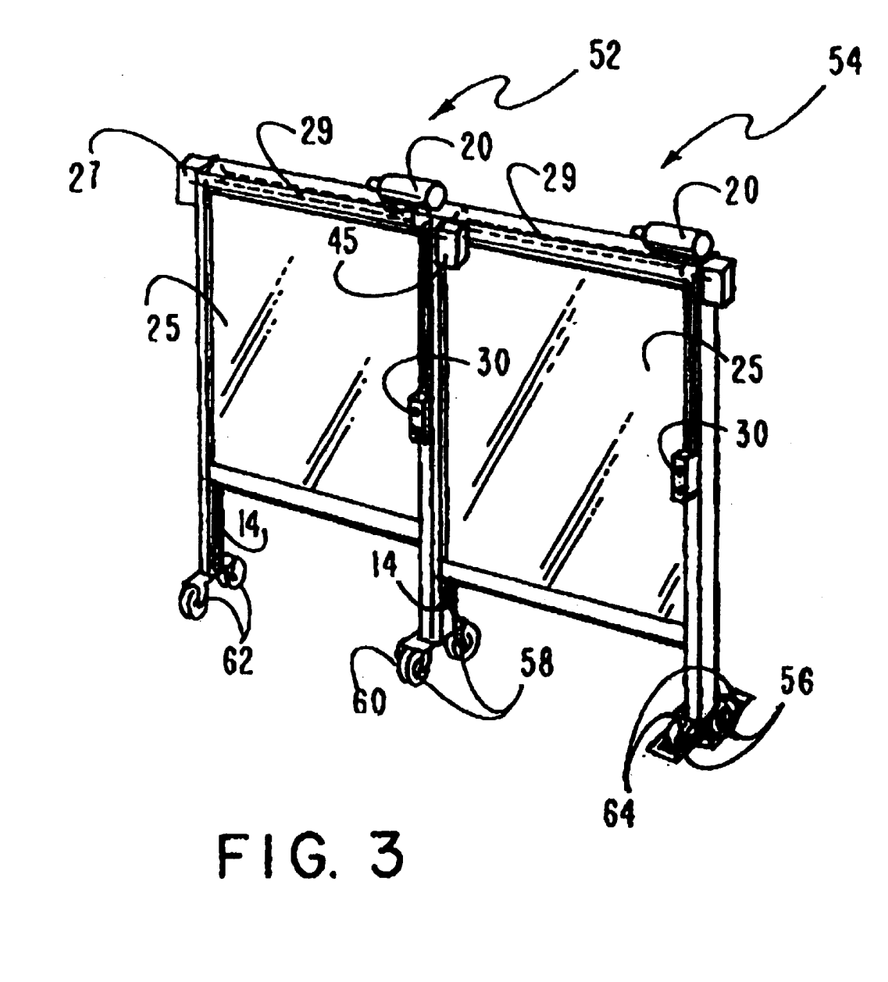
FIG. 3 illustrates a perspective view of a pair of safety guard units mounted on lockable wheels.

FIG. 3 illustrates. another embodiment of the safety guard units with each safety guard unit disposed on wheels, such as wheels 60 and 62, which can be locked after the guard units have been rolled into position. It is desirable to have a minimum of two adjacent guard units, such as guard units 52 and 54, attached. to one another so that if one guard unit were to move or fall, it would electrically disconnect from the adjacent unit and cause the machinery to shut down. The safety guard units can also be attached directly to the machinery itself rather than being affixed to the floor or being disposed on lockable wheels. Safety guard units on wheels can be moved from place to place where needed. For example, if a particular machine is not being utilized, its safety guard units can be moved to another machine and used there, thereby providing a significant cost savings. The wheels can be locked once in position by locks 64 as seen in FIG. 3.

In some embodiments the side track members of one safety guard unit can have attachment means along their outer sides to be attached to the outer side of another side track member of another safety guard unit. For example as seen in FIG. 1, second side track member 21 and first side track member 17, respectively, of fourth and third safety guard units 24 and 22 can be attached together. By bolting the bottoms of the side track members to the floor so that the side track members stand upright and perpendicular to the floor, the safety guard units can be positioned aligned in a straight line adjacent to one another or disposed at angles to one another such as seen between safety guard unit 18 and safety guard unit 16 so that they can be positioned around machinery of any shape. If the safety guard units are affixed to the floor, they do not need to be attached to one another. Each safety guard unit can have its own individual control unit, such as switch 30, and the safety guard unit's width, such as width 32 of third safety guard unit 22, and height can be of any desired dimensions. For example, as seen in FIG. 1, the width of fourth safety guard unit 24 is wider than the width of any of the other safety guard units.

Figure 2:
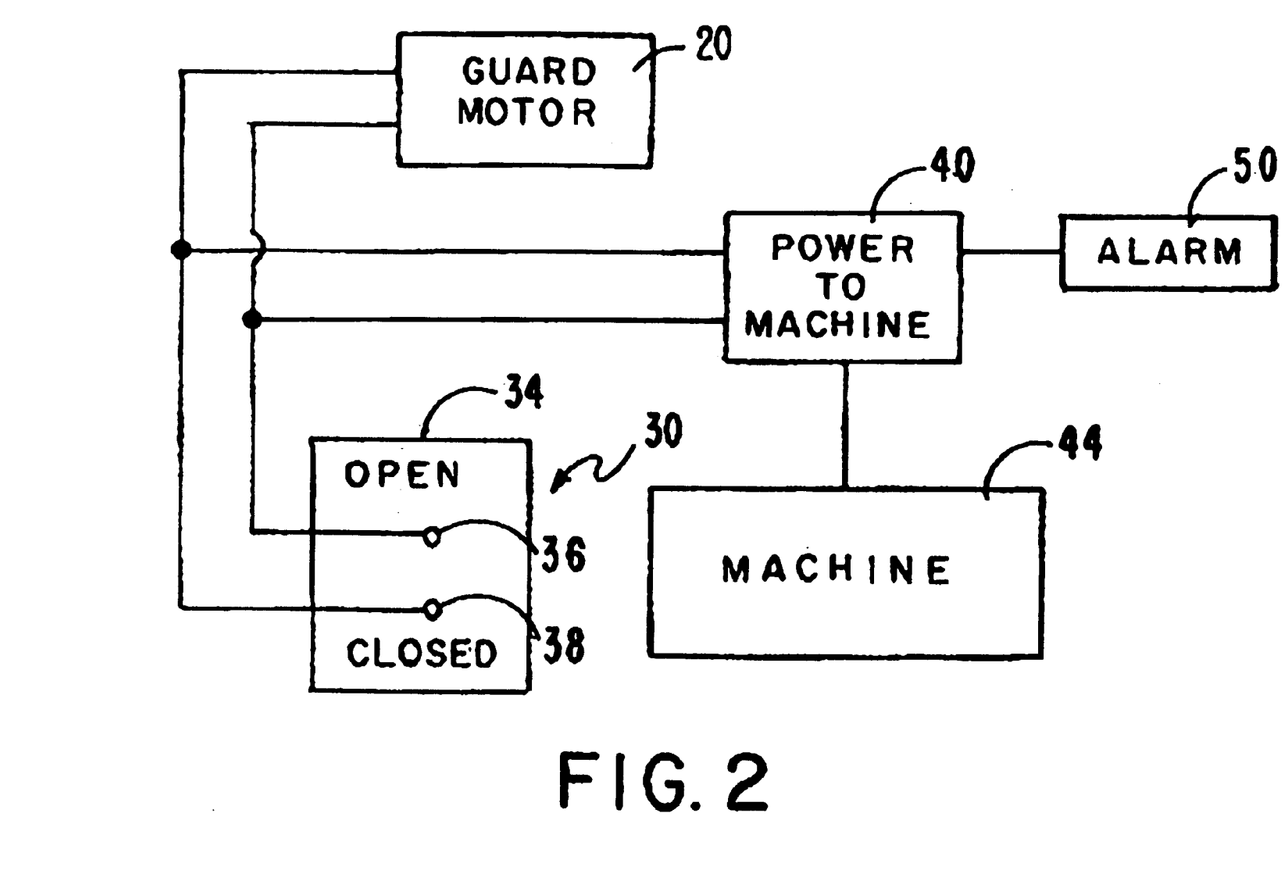
FIG. 2 illustrates a schematic block diagram of the power circuitry to operate the safety guard unit of this invention.

As seen in the schematic block diagram of FIG. 2, switch 30 can be comprised of a control box 34 which can be positioned near a safety guard unit and can have an open button 36 which can be interconnected to reversible guard motor 42 to drive the motor to roll up the transparent panel 25 on reel 29 and also at the same time to cause electrical power 40 to machine 44 to be shut off. Also within control box 34 is close button 38 which will cause guard motor 42 to reverse direction and unwind transparent panel 25, and once the transparent panel is fully unwound, will allow for reactivation of electrical power 40 to machine 44. In order for the operator to control when the machinery starts up, it is desirable that machinery start up be accomplished by a separate switch after the panel is in its closed position. When the panel is open, audible/visible alarm 50, also seen in FIG. 1 as light 48 with audible alarm, can be activated to warn people that the operative parts of the machinery are no longer guarded by the panel. A series of electrical or optical switches can be located at the bottom of each safety guard unit to act as a further safety interlock, which switches can be activated by the transparent panel being in its most downward, closed position in order for electrical power to the machinery to be restored. Also, electrical connections can be provided between adjacent safety guard units such as seen in FIG. 3. Thus if, for example, safety guard unit 54 should fall, its electrical connection with safety guard unit 52 would separate, causing the machinery to shut down.

An important feature of this invention is providing a flexible, transparent panel of each safety guard unit which can be rolled up and unwound very quickly, rolling it up when it is desired to gain access to the machinery behind it and deactivating the machinery in such situations. First safety guard unit 12 is shown with its transparent panel 25 in an up position so that access can be had to the machinery therebehind while third safety guard unit 22 is shown with its transparent panel in its most downward position, ready to protect the operator from operative parts of the machinery therebehind. It is a further object of this invention that a plurality of such safety guard units be positioned around the operative parts of a machine in a configuration of differing heights and widths and in differing angular configurations, as desired, to conform to the shape and dimensions of various kinds of machinery. Such units can be adjacent to one another as shown in FIG. 1 or can be separated a distance from one another depending on the location of the operative parts of the machine.

Although the present invention has been described with reference to particular embodiments, it will be apparent to those skilled in the art that variations and modifications can be substituted therefor without departing from the principles and spirit of the invention.

I claim:

1. A machine tool guard system for placement between a machine tool operator and the operative parts of a machine tool, said system having a safety guard unit, comprising:
    a first side track member and a second side track member, each track member having a top, a bottom, an inner side, an outer side, a front portion and a rear portion, each of said side track members disposed generally vertical;
    a rotatable reel disposed near said tops of said first and second side track members, said reel having a first end a second end defining a length therebetween;
    a flexible panel having a top, a bottom and first and second sides, said panel attached at its top to said reel;
    a power source;
    a reversible motor powered by said power source, said motor in a first mode disposed to rotate said reel in one direction to drive said panel downward in front of said operative parts of said machine tool between said machine tool operator and said machine tool; and in a second mode to reverse rotation of said reel to roll said panel up onto said reel; and,
    a control means adapted to be coupled to the machine tool and disposed such that power is provided to the machine tool only when the panel is in the fully closed position, and such that power to the machine tool is interrupted when the panel is moved from the fully closed position, thereby preventing the operator from gaining access to the machine tool while it is powered.

2. The system of claim 1 further including:
    a first channel and a second channel, said first and second channels defined, respectively, in said first and second side track members, said first and second channels facing one another, said panel's first and second sides disposed, respectively, in said panel's first and second channels.

3. The system of claim 1 further including at least two safety guard units.

4. The system of claim 2 further including at least two safety guard units.

5. The system of claim 4 wherein said safety guard units are disposed on a floor, said guard units being attached to said floor.

6. The system of claim 4 further including:
    means to interconnect the outer side of the first side track member of one safety guard unit to the outer side of the second side track member of the second safety guard unit.

7. The system of claim 5 further including:
    means to interconnect the outer side of the first side track member of one safety guard unit at an angle to the outer side of the second side track member of the second safety guard unit.

8. The system of claim 7 further including alarm means to indicate when said control means is in the second mode.

9. The system of claim 7 wherein said panel includes sound reduction means.

10. The system of claim 4 wherein said guard units are disposed on wheels.

11. The system of claim 10 wherein said guard units are interconnected to one another.

12. A machine tool safety guard for placement between a machine tool operator and the operative parts of a machine tool, comprising:
    first and second side track members, each including a top;
    a rotatable reel disposed adjacent the tops of the side track members;
    a flexible panel having a bottom and a top attached to the reel, such that the panel can be wound onto and off of the reel;
    a reversible motor coupled to the rotatable reel for rotating the reel in a first direction to move the panel downward in front of the operative parts of the machine tool, and for rotating the reel in a second direction for driving the panel upward and winding the panel onto the reel; and
    an interlock adapted to be coupled to the machine tool and disposed such that power is provided to the machine tool only when the panel is in the fully closed position, and such that power to the machine tool is interrupted when the panel is moved from the fully closed position, thereby preventing the operator from gaining access to the machine tool while it is powered.

13. The safety guard of claim 12, wherein the flexible panel has a fully-extended position wherein it blocks access to the machine tool, and wherein the interlock is disposed to sense when the panel is in the fully-extended position, such that the machine tool cannot operate until the panel is in the fully-extended position.

14. The safety guard of claim 12, wherein the interlock comprises a plug mounted on the bottom of the panel, and a receptacle mounted adjacent one of the side tracks near the bottom thereof.

15. The safety guard of claim 12, wherein the interlock is a switch.

16. The safety guard of claims 12, wherein the panel is a sheet of transparent material.

17. A machine tool safety guard for placement between a machine tool operator and the operative parts of a machine tool, comprising:
    first and second side track members, each including a top;
    a rotatable reel disposed adjacent the tops of the side track members;
    a flexible panel having a bottom and a top attached to the reel, such that the panel can be wound onto and off of the reel;
    a reversible motor coupled to the rotatable reel for rotating the reel in a first direction to move the panel downward in front of the operative parts of the machine tool, and for rotating the reel in a second direction for driving the panel upward and winding the panel onto the reel; and an interlock adapted to be coupled to the machine tool, the interlock sensing the position of the panel and being disposed such that power is provided to the machine tool only when the panel is in the fully closed position and such that power to the machine tool is interrupted when the panel is moved from the fully closed position, thereby preventing the operator from gaining access to the machine tool while it is powered.

18. The safety guard of claim 17, wherein the flexible panel has a fully-extended position wherein it blocks access to the machine tool, and wherein the interlock is disposed to sense when the panel is in the fully-extended position, such that the machine tool cannot operate until the panel is in the fully-extended position.

19. The safety guard of claim 17, wherein the interlock comprises a plug mounted on the bottom of the panel, and a receptacle mounted adjacent one of the side tracks near the bottom thereof.

20. The safety guard of claim 17, wherein the interlock is a switch.

21. The safety guard of claim 17, wherein the panel is a sheet of transparent material.

22. A machine tool safety guard for placement between a machine tool operator and the operative parts of a machine tool, comprising:

first and second side track members, each including a top;

a rotatable reel disposed adjacent the tops of the side track members;

a flexible panel having a bottom and a top attached to the reel, such that the panel can be wound onto and off of the reel;

a reversible motor coupled to the rotatable reel for rotating the reel in a first direction to move the panel downward in front of the operative parts of the machine tool, and for rotating the reel in a second direction for driving the panel upward and winding the panel onto the reel; and an interlock adapted to be coupled to the machine tool, the interlock sensing when the panel is in a blocking position relative to the machine tool, such that the machine tool cannot be operated until the interlock senses the panel is in a blocking position and such that the machine tool ceases operation when the panel is moved away from the blocking position, thereby preventing the operator from gaining access to the machine tool when the machine tool is in operation.

23. The safety guard of claim 22, wherein the blocking position is in a fully-extended position of the panel relative to the reel.

24. The safety guard of claims 22, wherein the interlock comprises a plug mounted on the bottom of the panel, and a receptacle mounted adjacent one of the side tracks near the bottom thereof.

25. The safety guard of claim 22, wherein the interlock is a switch.

26. The safety guard of claim 22, wherein the panel is a sheet of transparent material.

27. A machine tool safety guard for placement between a machine tool operator and the operative parts of a machine tool, comprising:

first and second side track members, each including a top;

a rotatable reel disposed adjacent the tops of the side track members;

a flexible panel having a bottom and a top attached to the reel, such that the panel can be wound onto and off of the reel;

a reversible motor coupled to the rotatable reel for rotating the reel in a first direction to move the panel downward in front of the operative parts of the machine tool, and for rotating the reel in a second direction for driving the panel upward and winding the panel onto the reel; and a means for sensing the position of the panel, the means for sensing being adapted to be coupled to the machine tool and disposed such that power is provided to the machine tool only when the panel is in the fully closed position, and such that power to the machine tool is interrupted when the panel is moved from the fully closed position, thereby preventing the operator from gaining access to the machine tool while it is powered.

28. The safety guard of claim 27, wherein the flexible panel has a fully-extended position wherein it blocks access to the machine tool, and wherein the sensing means senses when the panel is in the fully-extended position, such that the machine tool cannot operate until the panel is in the fully-extended position.

29. The safety guard of claim 27, wherein the means for sensing comprises a plug mounted on the bottom of the panel, and a receptacle mounted adjacent one of the side tracks near the bottom thereof.

30. The safety guard of claim 27, wherein the sensing means is a switch.

31. The safety guard of claim 27, wherein the panel is a sheet of transparent material.

32. A safety guard disposed in front of a machine tool for selectively limiting access to the machine tool, comprising:

a track structure having a top disposed adjacent the machine tool;

a reel mounted for rotation on the top of the track structure;

a panel windable on the reel and coupled to the reel for unwinding and winding movement therefrom between blocking and unblocking positions in front of the machine tool; and an interlock for detecting when the panel is in the blocking position, the interlock being adapted to be coupled to the machine tool such that the machine tool cannot be operated until the interlock detects the panel is in the blocking position and such that the machine tool ceases operation when the panel is moved from the blocking position, thereby preventing the operator from gaining access to the machine tool while the machine tool is operating.

33. A machine tool safety guard system for placement between a machine tool operator and the operative parts of a machine tool, said system having a safety guard unit, comprising:

a first side track member and a second side track member, each track member having a top, a bottom, an inner side, an outer side, a front portion and a rear portion, each of said side track members disposed generally vertical;

a rotatable reel disposed near said tops of said first and second side track member, said reel having a first end and a second end defining a length therebetween;

a flexible panel having a top, a bottom and first and second sides, said panel attached at its top to said reel;

a power source; and a reversible motor powered by said power source, said motor in a first mode disposed to rotate said reel in one direction to drive said panel downward in front of said operative parts of said machine tool between said machine tool operator and said machine tool and to allow electrical power to pass to said machine tool, and in a second mode to reverse rotation of said reel to roll said panel up onto said reel and to deactivate electrical power to said machine tool while said machine tool operator gains access to said machine tool.

34. A machine tool fabricating machine guard for placement between a fabricating machine operator and the operative parts of a fabricating machine, said system having a safety guard unit, comprising:
   a first side track member and a second side track member, each track member having a top, a bottom, an inner side, an outer side, a front portion and a rear portion, each of said side track members disposed generally vertical;
   a rotatable reel disposed near said tops of said first and second side track members, said reel having a first end a second end defining a length therebetween;
   a flexible panel having a top, a bottom and first and second sides, said panel attached at its top to said reel;
   a power source;
   a reversible motor powered by said power source, said motor in a first mode disposed to rotate said reel in one direction to drive said panel downward in front of said operative parts of said fabricating machine between said fabricating machine operator and said fabricating machine; and in a second mode to reverse rotation of said reel to roll said panel up onto said reel; and,
   a control means adapted to be coupled to the fabricating machine and disposed such that power is provided to the fabricating machine only when the panel is in the fully closed position, and such that power to the fabricating machine is interrupted when the panel is moved from the fully closed position, thereby preventing the operator from gaining access to the fabricating machine while it is powered.

35. A fabricating machine safety guard for placement between a fabricating machine operator and the operative parts of a fabricating machine, comprising:
   first and second side track members, each including a top;
   a rotatable reel disposed adjacent the tops of the side track members;
   a flexible panel having a bottom and a top attached to the reel, such that the panel can be wound onto and off of the reel;
   a reversible motor coupled to the rotatable reel for rotating the reel in a first direction to move the panel downward in front of the operative parts of the fabricating machine, and for rotating the reel in a second direction for driving the panel upward and winding the panel onto the reel; and
   an interlock adapted to be coupled to the fabricating machine and disposed such that power is provided to the fabricating machine only when the panel is in the fully closed position, and such that power to the fabricating machine is interrupted when the panel is moved from the fully closed position, thereby preventing the operator from gaining access to the fabricating machine while it is powered.

36. A fabricating machine safety guard for placement between a fabricating machine operator and the operative parts of a fabricating machine, comprising:
   first and second side track members, each including a top;
   a rotatable reel disposed adjacent the tops of the side track members;
   a flexible panel having a bottom and a top attached to the reel, such that the panel can be wound onto and off of the reel;
   a reversible motor coupled to the rotatable reel for rotating the reel in a first direction to move the panel downward in front of the operative parts of the fabricating machine, and for rotating the reel in a second direction for driving the panel upward and winding the panel onto the reel; and
   an interlock adapted to be coupled to the fabricating machine, the interlock sensing the position of the panel and being disposed such that power is provided to the fabricating machine only when the panel is in the fully closed position and such that power to the fabricating machine is interrupted when the panel is moved from the fully closed position, thereby preventing the operator from gaining access to the fabricating machine while it is powered.

37. A fabricating machine safety guard for placement between a fabricating machine operator and the operative parts of a fabricating machine, comprising:
   first and second side track members, each including a top;
   a rotatable reel disposed adjacent the tops of the side track members;
   a flexible panel having a bottom and a top attached to the reel, such that the panel can be wound onto and off of the reel;
   a reversible motor coupled to the rotatable reel for rotating the reel in a first direction to move the panel downward in front of the operative parts of the fabricating machine, and for rotating the reel in a second direction for driving the panel upward and winding the panel onto the reel; and
   an interlock adapted to be coupled to the fabricating machine, the interlock sensing when the panel is in a blocking position relative to the fabricating machine, such that the fabricating machine cannot be operated until the interlock senses the panel is in a blocking position and such that the fabricating machine ceases operation when the panel is moved away from the blocking position, thereby preventing the operator from gaining access to the fabricating machine when the fabricating machine is in operation.

38. A fabricating machine safety guard for placement between a fabricating machine operator and the operative parts of a fabricating machine, comprising:
   first and second side track members, each including a top;
   a rotatable reel disposed adjacent the tops of the side track members;
   a flexible panel having a bottom and a top attached to the reel, such that the panel can be wound onto and off of the reel;
   a reversible motor coupled to the rotatable reel for rotating the reel in a first direction to move the panel downward in front of the operative parts of the fabricating machine, and for rotating the reel in a second direction for driving the panel upward and winding the panel onto the reel; and
   a means for sensing the position of the panel, the means for sensing being adapted to be coupled to the fabricating machine and disposed such that power is provided to the fabricating machine only when the panel is in the fully closed position, and such that power to the fabricating machine is interrupted when the panel is moved from the fully closed position, thereby preventing the operator from gaining access to the fabricating machine while it is powered.

39. A safety guard disposed in front of a fabricating machine for selectively limiting access to the fabricating machine, comprising:

a track structure having a top disposed adjacent the fabricating machine;

a reel mounted for rotation on the top of the track structure;

a panel windable on the reel and coupled to the reel for unwinding and winding movement therefrom between blocking and unblocking positions in front of the fabricating machine; and an interlock for detecting when the panel is in the blocking position, the interlock being adapted to be coupled to the fabricating machine such that the fabricating machine cannot be operated until the interlock detects the panel is in the blocking position and such that the fabricating machine ceases operation when the panel is moved from the blocking position, thereby preventing the operator from gaining access to the fabricating machine while the fabricating machine is operating.

40. A fabricating machine safety guard system for placement between a fabricating machine operator and the operative parts of a fabricating machine, said system having a safety guard unit, comprising:

a first side track member and a second side track member, each track member having a top, a bottom, an inner side, an outer side, a front portion and a rear portion, each of said side track members disposed generally vertical;

a rotatable reel disposed near said tops of said first and second side track member, said reel having a first end and a second end defining a length therebetween;

a flexible panel having a top, a bottom and first and second sides, said panel attached at its top to said reel;

a power source; and a reversible motor powered by said power source, said motor in a first mode disposed to rotate said reel in one direction to drive said panel downward in front of said operative parts of said fabricating machine between said fabricating machine operator and said fabricating machine and to allow electrical power to pass to said fabricating machine, and in a second mode to reverse rotation of said reel to roll said panel up onto said reel and to deactivate electrical power to said fabricating machine while said fabricating machine operator gains access to said fabricating machine.

* * * * *